Figure 1:
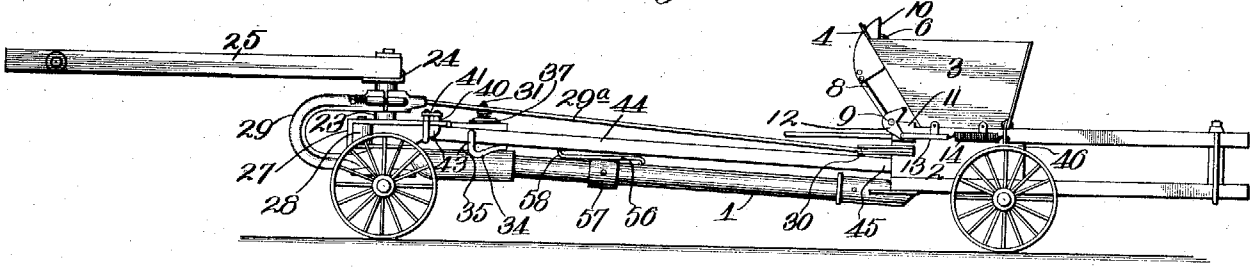

No. 12,559. REISSUED NOV. 13, 1906.

H. M. TALLMAN.

HAY PRESS.

APPLICATION FILED APR. 27, 1906.

3 SHEETS—SHEET 1.

Witnesses:
Frank R. Glow.
H. C. Rodgers.

Inventor:
Horace M. Tallman
By Geo. H. Thorpe Atty.

No. 12,559. REISSUED NOV. 13, 1906.

H. M. TALLMAN.

HAY PRESS.

APPLICATION FILED APR. 27, 1906.

3 SHEETS—SHEET 2.

Witnesses:
Frank R. Glover
H. C. Rodgers

Inventor:
Horace M. Tallman.
By George H. Thorpe Atty.

No. 12,559. REISSUED NOV. 13, 1906.
H. M. TALLMAN.
HAY PRESS.
APPLICATION FILED APR. 27, 1906.
3 SHEETS—SHEET 3.
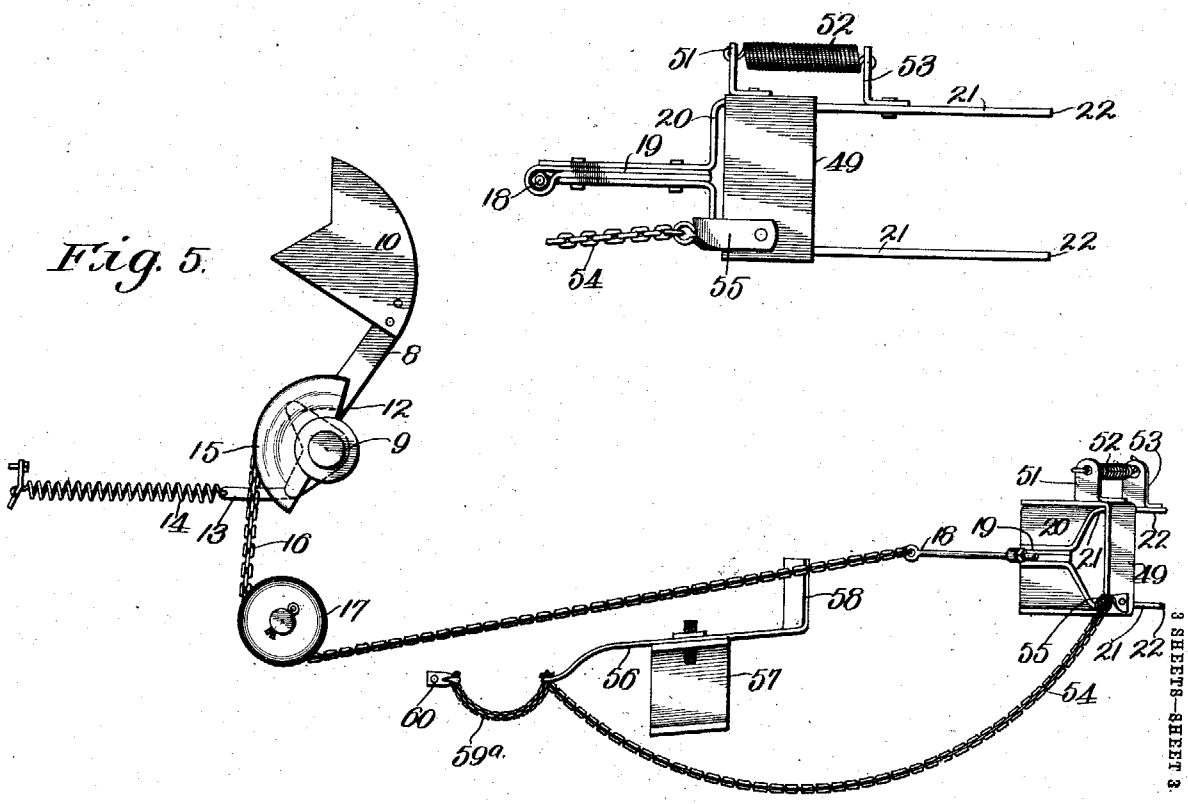
Witnesses:
Frank R. Glow
H. C. Rodgers.
Inventor:
Horace M. Tallman.
By George H. Thorpe Atty.

UNITED STATES PATENT OFFICE.

HORACE M. TALLMAN, OF SHELBYVILLE, ILLINOIS, ASSIGNOR TO ADMIRAL HAY PRESS CO., OF KANSAS CITY, MISSOURI, A CORPORATION OF MISSOURI.

HAY-PRESS.

No. 12,559. Specification of Reissued Letters Patent. Reissued Nov. 13, 1906.

Original No. 787,132, dated April 11, 1905. Application for reissue filed April 27, 1906. Serial No. 313,907.

*To all whom it may concern:*

Be it known that I, HORACE M. TALLMAN, a citizen of the United States, residing at Shelbyville, in the county of Shelby and State of Illinois, have invented certain new and useful Improvements in Hay-Presses, of which the following is a specification.

My present invention relates to improvements in hay-presses, and has special reference to an improved horse-power press in which a novel and satisfactory form of self-feed is employed, my self-feed attachment being so constructed as to have the necessary power and strength to feed the hay to the press in heavy feed, as is desired in two-beat presses. The same, however, can be used in connection with three-beat presses, as will be hereinafter shown.

Another object of my invention is to provide a straight direct-pull self-feeding mechanism which has power enough to push down the heaviest feeds of hay that is possible to feed in any press, large or small, the said feeding-mechanism being operated simultaneously with the compressing mechanism, so that the hay is fed directly into the hopper in front of the plunger at the desired time and in uniform bulks.

Another object of my invention is to provide a self-feeding mechanism which will trip before making its full downstroke in the event that the feed or charge of baling material is greater than the capacity of the feed-chamber or some other obstruction other than the follower or plunger is in the path of the feed-arms.

Another object of my invention is the provision of a tripping device which will not allow the feed-arms to be pulled down into the press in the event the follower does not rebound clear, so that the arms of the self-feed can go to the bottom of the press, the said tripping device operating the self-feed, so as to prevent the same from being forced down upon the follower to prevent the self-feed from being broken, this trip device being entirely actuated by the plunger-actuating device.

I would have it understood that my improved self-feeding attachment and tripping device can be employed on two-beat presses as well as three-beat presses and that the tripping attachment can be used with other forms of self-feeders.

To attain these objects, the invention consists of novel features of construction and combination of parts substantially as disclosed herein.

Figure 2:
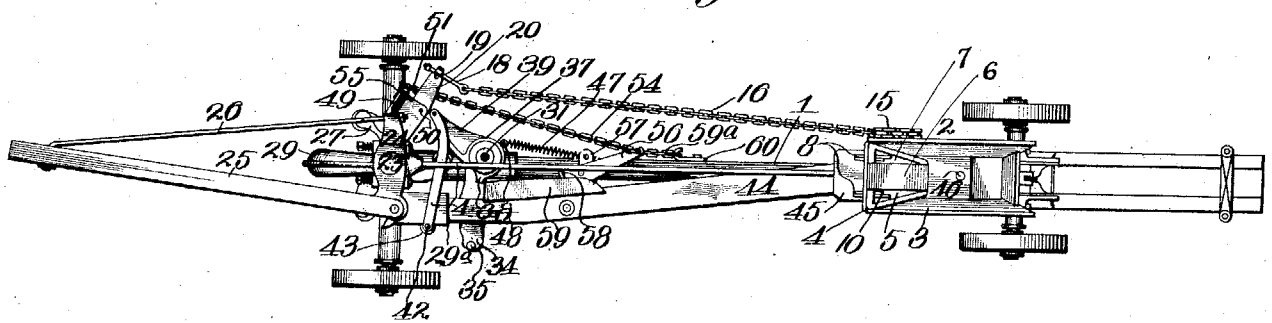
Figure 3:
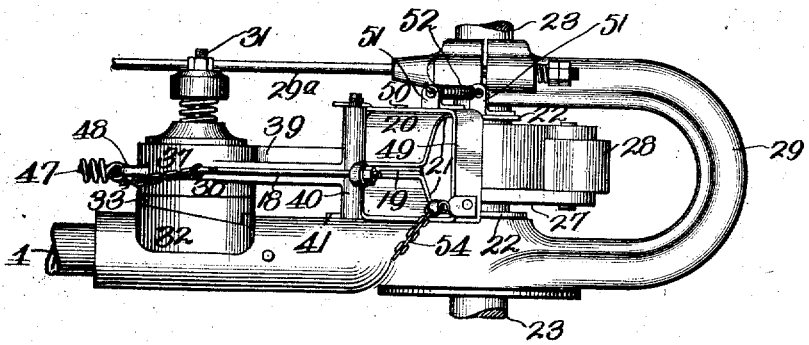
Figure 4:
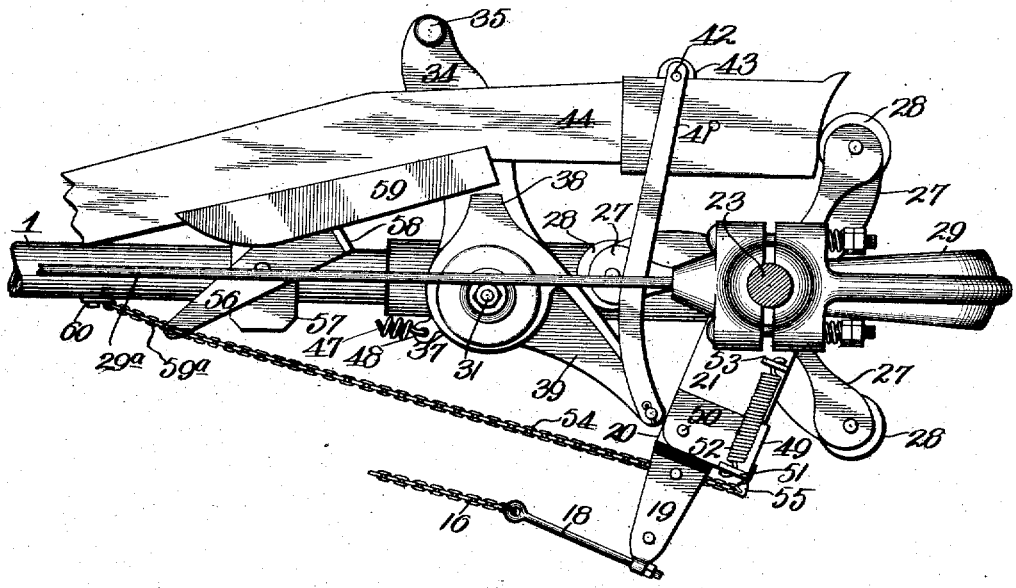

In the accompanying drawings, Figure 1 is a side elevation of my complete hay-press. Fig. 2 is a top plan view thereof. Fig. 3 is an enlarged side elevation of the three-beat and trip mechanism of the press. Fig 4 is a top plan view thereof. Fig. 5 is an enlarged detail view of the feeding mechanism detached from the baling apparatus. Fig. 6 is an enlarged detail view of the tripping device for the self-feeding mechanism detached.

Referring to the drawings, the numeral 1 designates the bed of the hay-press, 2 the baling-case at one end of the same, and 3 the hopper, said hopper being so arranged with respect to and in communication with the baling chamber or case as to allow the hay to be properly fed therein. In the front wall 4 of the hopper I provide an opening 5, and upon the inner face of said wall, having both of its ends attached thereto, is an inwardly-curved plate or guide-wall 6. This guide-wall may be formed integral with the wall of the hopper, but is so arranged as to divide the opening 5 into two substantially parallel slots 7, so that the feeding-arms 8, carried by the rock-shaft 9, may have their upper two point ends 10 project into the hopper through said slots and be operated so as to feed the hay into the baling chamber or case. This rock-shaft 9 is journaled in the bearings of the bracket 11 and has upon one end a double crank-arm 12, having pivotally connected thereto a link 13, which has connected to it the returning-spring 14, which is adapted to automatically return the feeding-arms to their upright position. Carried upon the opposite end of the rock-shaft 9 is a grooved segment 15, which has mounted therein the operating-chain 16, which passes over the guide-pulley 17 and is connected to a rod 18, adjustably secured to the end of the arm 19, carried by the frame 20. This frame 20 consists of the two side pieces 21, which have their inner ends 22 pivotally connected to the vertical power-shaft 23. This much of the mechanism comprises my self-feeding attachment, and it can be readily seen that the same can be attached to approved forms of either two or three beat baling-presses.

Connected to the upper end of the power-shaft 23 is a sweep-head 24, to which is secured the sweep 25 and bracing-rod 26. By this means horse-power is transmitted to the power-shaft, and consequently to the triple-arm trip-lever 27, the same being rigidly secured to and revoluble with the power-shaft 23. In the outer end of each one of the arms of this trip-lever is mounted an antifriction-roller 28.

Connected to the forward end of the bed of the hay-press is a yoke 29, whose upper end surrounds and forms one of the upper bearings for the power-shaft 23, an adjustable strengthening-rod 29ª being secured to the upper end of said yoke and to the yoke 30, secured to the forward portion of the baling-casing.

Secured to the bed and rear of the power-shaft 23 is a vertical axle 31 and a circular disk 32, whose upper face is inclined or beveled toward the front of the bed, and rotatably mounted upon said shaft and provided with a corresponding inclined disk 33 is a guide-arm 34, provided upon its free end with the upwardly-extending guide 35. Surrounding the said axle above the disk of the arm is a washer 36, and pivotally mounted above said washer is a disk 37, carrying a trip-off lug 38 and a curved arm 39, provided with a vertical sleeve 40, to which is pivotally secured a pair of curved links 41, whose outer free ends are pivotally secured to the pin 42 of the projection 43, carried upon the outer end of the pitman 44. Carried upon the extreme other end 45 of the pitman is the plunger 46, which is adapted to slidably operate within the baling-chamber. In order to properly return the pitman after the compression of the bundle of hay, I provide a spring 47, which is connected to the pitman intermediate of its length and to the eyed lug 48 of arm 39.

Thus far I have described the compressing mechanism and the automatic feeding mechanism; but in order to allow the feeding-arms to at all times be free of the plunger, so as not to be injured thereby and also escape injury through resistance offered by a charge of baling material exceeding the capacity of the press or some other obstruction in the path of downward movement of the feeding-arms, I provide a frame 49, which is pivotally secured at 50 to the outer portion of the frame 20, to which the feeding mechanism is connected. This frame is provided upon its upper face with a lug 51, to which is secured a spring 52, whose other end is secured to a lug 53, rigidly secured upon the feed-operating frame. From this construction it will be seen that while one of the trip-arms is pushing the plunger forward and compressing a bundle of hay the arm forward thereof is about to contact the frame 49 and slightly pull the automatic feed-operating frame rearward, and as soon as the first-mentioned arm has released the pitman the pitman and plunger are returned and the feeding-arms of the feeding mechanism are operated to feed a bundle of hay into the hopper in front of the plunger, this feeding operation being continued until the arm which has just been released from the end of the pitman is in contact with the curved arm 39 and the pitman is about to be pushed forward by said contact. At this juncture the trip-arm, which is engagement with the spring-actuated frame 49, is in such a position that the pressure thereon moves the spring-actuated frame 49 to one side, and thereby releases the feed-actuated frame 20 and allows the spring connected to the rock-shaft of the feed-arms to return said feed-arms to their upright position, so that the next action of the pitman will properly compress the bundle of hay just fed into the compressing-chamber.

It will be noted from the foregoing and from the fact that the radius of the circle described by the axes of the trip-lever rollers 28 is slightly less than the distance between the axis of the power-shaft and pivotal point 50 of frame 49 that the trip-lever rollers apply pressure on frame 49 inward of its center, and it follows that if the resistance to downward movement of the feed-arms is excessive—*i. e.*, more than that which should be offered by a proper charge of baling material to the feed-chamber—the spring 52 will be overcome and said frame will swing outward from the path of the roller 28 applying the pressure, and thus effect a premature release—*i. e.*, permit the feed-arms to be reelevated before their full downstroke has been completed. This premature release will occur whether the means which arrests the feed-arms be an overcharge of feed, a bar or stick deposited in the hopper with the baling material, or the plunger on failure to recoil.

In order to still further guard against injury to the feed mechanism in the event that the plunger fails to recoil clear of the feed-arms in their downward movement, I provide a chain 54, which has one end connected to the lug 55, carried upon the lower front wall of the spring-actuated frame 49, and the other end of said chain is connected to the double-ended trip-lever 56, which is pivotally mounted intermediate of its length to the plate 57, carried upon the bed 1 of the press. Upon the other end of this trip-lever I provide an upwardly-projecting lug 58, while a tripping-plate 59 is carried upon the inner face of the pitman, another chain 59ª being connected at the opposite end of said trip-lever and to the lug 60, secured upon the bed of the press.

The trip mechanism for releasing the feeding mechanism and providing a means whereby the feeders are prematurely released is the gist of my invention and resides in the feeder 8, chain 16, arm 19, frame 20, and the small trip-frame 49, combined with the tripping-lever 27, any one of whose members while in operation is in engagement with the frame 49. Should the feeder be in danger of striking the plunger when the latter fails to rebound, at which time a very early release is necessary, the trip-plate 59 engages or contacts the lug 58, holding the lever 56 stationary, the said lever holding the chain 54, which in turn holds the frame 49, causing the disengaging of the same from one of the levers 27, and thus releasing the frame 20, arm 19, and chain 16, so that the spring 14 is free to operate the feed and lift the same out of the hopper, and consequently out of the path of the pitman's plunger. This releasing operation takes place as the pitman and plunger are moving toward the hopper.

The automatically-operated self-feeding attachment is constructed so as to operate just after the return of the plunger, so as to feed the hay within the baling-chamber and be itself returned out of the way of the plunger before the plunger compresses the hay just fed, the said feed mechanism being combined with an automatic trip which is arranged to be operated by the pitman and to return the feed mechanism to its inoperative position in case the pitman and plunger are not returned to the proper position. In this way the hay is at all times properly fed to the compressing-chamber and the feeding device is prevented from being broken by the plunger or compressing mechanism.

All of the mechanism combined in this machine are controlled primarily and automatically by the trip-lever, which in this case is a three-armed member; but it can be constructed with a two-armed member, the construction herein shown being not intended to limit me to the three-armed trip-lever.

Having thus described the invention, what I claim as new, and desire to secure by Letters Patent, is—

1. In a baling-press, a trip-lever, a feeder to move upward and downward alternately, a movable frame connected to effect downward movement of said feeder, means for actuating the feeder to reverse said movement and return the frame toward its original position, and a movable frame connected to the first-named movable frame and adapted to be engaged and at times pushed aside by said trip-lever before the feeder has been fully depressed.

2. In a baling-press, a trip-lever, a feeder to move upward and downward alternately, a movable frame to effect downward movement of the feeder, a flexible connection between the same and the feeder, yielding means for actuating the feeder to reverse its movement and return the movable frame toward its original position, and a movable frame connected to the first-named movable frame and adapted to be engaged and at times pushed aside by said trip-lever before the feeder has been fully depressed.

3. In a baling-press, a trip-lever, a feeder to move upward and downward alternately, a movable frame, a flexible connection between the same and the feeder, a retractile spring for effecting the upward movement of the feeder and the return of the movable frame toward its original position after effecting the depression of the feeder, and a movable frame connected to the first-named movable frame and adapted to be engaged and at times pushed aside by said trip-lever before the downward movement of the feeder is completed.

4. In a baling-press, a rotary trip-lever, a feeder to move downward and upward alternately, a movable frame connected to effect the downward movement of the feeder, means for actuating the feeder to move upward and return the movable frame toward its original position, and a frame pivoted to the said movable frame and adapted to be engaged and at times pushed aside by said trip-lever before the downward movement of the feeder is completed.

5. In a baling-press, a rotary trip-lever, a feeder pivoted to move downward and upward alternately, a movable frame connected to effect the downward movement of the feeder, a frame pivoted to the first-named frame, and a spring holding said pivoted frame yieldingly in the path of said trip-lever.

6. In a baling-press, a power-shaft having trip-arms, a feeder to move into and withdraw from the baling-chamber, a pivoted frame with its axis coincidental with that of the power-shaft, a connection between said pivoted frame and the feeder, and a movable frame connected to the pivoted frame and held yieldingly in the path of the trip-arms.

7. In a baling-press, a power-shaft having trip-arms, a feeder to move into and withdraw from the baling-chamber of the baling-press, a pivoted frame with its axis coincidental with that of the power-shaft, a flexible connection between said pivoted frame and the feeder whereby movement imparted to one of said elements is transmitted to the other, and a spring holding the second pivoted frame yieldingly in the path of the trip-arms.

8. The combination with a baling-press having a baling-chamber provided with a communicating superposed hopper, a vertical power-shaft having trip-arms, a plunger in the baling-chamber and a plunger-beam connected to the plunger, of a feeder in the baling-chamber and adapted to move downward and upward through said hopper, a spring holding said feeder normally elevated, a frame pivoted on the power-shaft and connected to the feeder, and a second frame pivotally carried by the first-named frame and held yieldingly in the path of said trip-arms.

9. In a hay-press, the combination of a bed, a baling-chamber, a hopper in communication therewith, compressing mechanism, feeding mechanism, mechanism for actuating the feed and compressing mechanism in succession, and mechanism for returning the feed mechanism to inoperative position should the compressing mechanism stick in the baling-chamber.

10. In a hay-press, the combination of a bed, a baling-chamber, a hopper in communication therewith, compressing mechanism, feeding mechanism, mechanism for actuating the feeding and compressing mechanism in succession, and a trip mechanism operated by the compressing mechanism to release the feeding mechanism to prevent accident to the same.

11. In a hay-press the combination with a bed, a baling-chamber, a hopper, and compression mechanism, of a feeding mechanism comprising a rock-shaft pivotally mounted in front of the hopper having arms carried by said rock-shaft and adapted to be projected into the hopper, a frame connected to said rock-shaft through a flexible connection, and means for operating said frame to feed hay within the hopper and means to operate the compression mechanism after the feeding mechanism.

12. In a hay-press, the combination with a bed, a baling-chamber, a hopper, and compression mechanism, of a feeding mechanism comprising a rock-shaft pivotally mounted in front of the hopper having arms carried by said rock-shaft and adapted to be projected into the hopper, a frame connected to said rock-shaft through a flexible connection, mechanism for operating said frame to feed hay within the hopper and mechanism to operate the compression mechanism after the feeding mechanism, and a trip mechanism connected to the feed mechanism and adapted to be operated by the compression mechanism to allow the premature return of the feeding mechanism.

13. In a baling-press, the combination with a bed, a baling-case, a hopper and compressing mechanism, of a feeding mechanism, a trip mechanism for prematurely releasing the feeding mechanism, and mechanism for operating the feed mechanism and compressing mechanism.

14. The combination in a baling-press, of feeding mechanism therefor comprising a pair of pivoted arms, a flexible connection connecting said pivoted arms, a vertical power-shaft, an arm rotatably mounted on said power-shaft, and a trip-lever having a plurality of arms connected to the power-shaft and adapted to contact one of said pivoted arms to operate the feeding mechanism.

15. The combination in a baling-press, with a compressing mechanism, of a feeding mechanism, comprising a pair of pivoted arms, a flexible connection connecting said pivoted arms, a vertical power-shaft, an arm rotatably mounted on said power-shaft, and a trip mechanism connected to said arm and to the bed-plate adapted to be operated by the compressing mechanism to prematurely return the feeding mechanism in inoperative position.

16. In combination with a baling-press provided with a feeding and compressing mechanism, of a trip mechanism for prematurely releasing the feeding mechanism, consisting of a trip pivotally mounted in the press, a flexible connection connected to said trip and the feeding mechanism, and means connected to the compressing mechanism adapted to engage said trip to pull upon the flexible connection and release the feeding mechanism.

17. In a hay-press, the combination with a bed, a baling-chamber, a hopper in communication therewith, compressing mechanism, feeding mechanism, and mechanism for actuating the feed and compressing mechanism in succession, of a trip mechanism for prematurely releasing the feeding mechanism, consisting of a trip pivotally mounted in the press, a flexible connection connected to said trip and the feeding mechanism, and means connected to the compressing mechanism adapted to engage said trip to pull the flexible connection and release the feeding mechanism.

18. In a hay-press, the combination with a bed, a baling-chamber, a hopper in communication therewith, compressing mechanism, feeding mechanism, and mechanism for actuating the feeding and compressing mechanism in succession, of a trip mechanism for prematurely releasing the feeding mechanism, consisting of a trip pivotally mounted in the press, a flexible connection connected to said trip and the feeding mechanism, and means connected to the compressing mechanism adapted to engage said trip to pull upon the flexible connection and release the feeding mechanism.

19. In a hay-press, the combination with a bed, a baling-chamber, a hopper, compressing mechanism, feeding mechanism, comprising a rock-shaft pivotally mounted in front of the hopper having arms carried by said rock-shaft and adapted to be projected into the hopper, a frame connected to said rock-shaft through a flexible connection, mechanism for operating said frame to feed hay within the hopper and to operate the compression mechanism after the feeding mechanism, of a trip mechanism for prematurely releasing the feeding mechanism consisting of a trip pivotally mounted in the press, a flexible connection connected to said trip and the feeding mechanism and means connected to the compressing mechanism adapted to engage said trip to pull the flexible connection and release the feeding mechanism.

20. In a baling-press, the combination with a bed, a baling-casing, a hopper and compression mechanism, of a feeding mechanism, a trip mechanism for prematurely releasing the feeding mechanism, consisting of a trip pivotally mounted in the press, a flexible connection connected to said trip and the feeding mechanism, and means connected to the compressing mechanism adapted to engage the trip to pull upon the flexible connection and release the feeding mechanism, and mechanism for operating the feed mechanism and compressing mechanism.

21. The combination in a baling-press with a feeding mechanism therefor comprising a pair of pivoted arms, a flexible connection connected to said pivoted arms, a vertical power-shaft, an arm rotatably mounted on said power-shaft, of a trip mechanism for prematurely releasing the feeding mechanism consisting of a trip pivotally mounted in the press, a flexible connection connected to said trip and the feeding mechanism, and means connected to the compression mechanism of the press adapted to engage said trip to pull upon the flexible connection and release the feeding mechanism.

22. The combination in baling-press, with a compressing mechanism, of a feeding mechanism, comprising a pair of pivoted arms, a flexible connection connected to said pivoted arms, a vertical power-shaft, an arm rotatably mounted on said power-shaft, of a trip mechanism for prematurely releasing the feeding mechanism, consisting of a trip pivotally mounted in the press, a flexible connection connected to said trip and the feeding mechanism, and means connected to the compressing mechanism adapted to engage said trip to pull upon the flexible connection and release the feeding mechanism.

In testimony whereof I affix my signature in presence of two witnesses.

HORACE M. TALLMAN.

Witnesses:
WM. GILES,
JOHN CLARK.